April 15, 1947. H. PERROT 2,418,848
BRAKE
Filed May 20, 1942 2 Sheets-Sheet 2

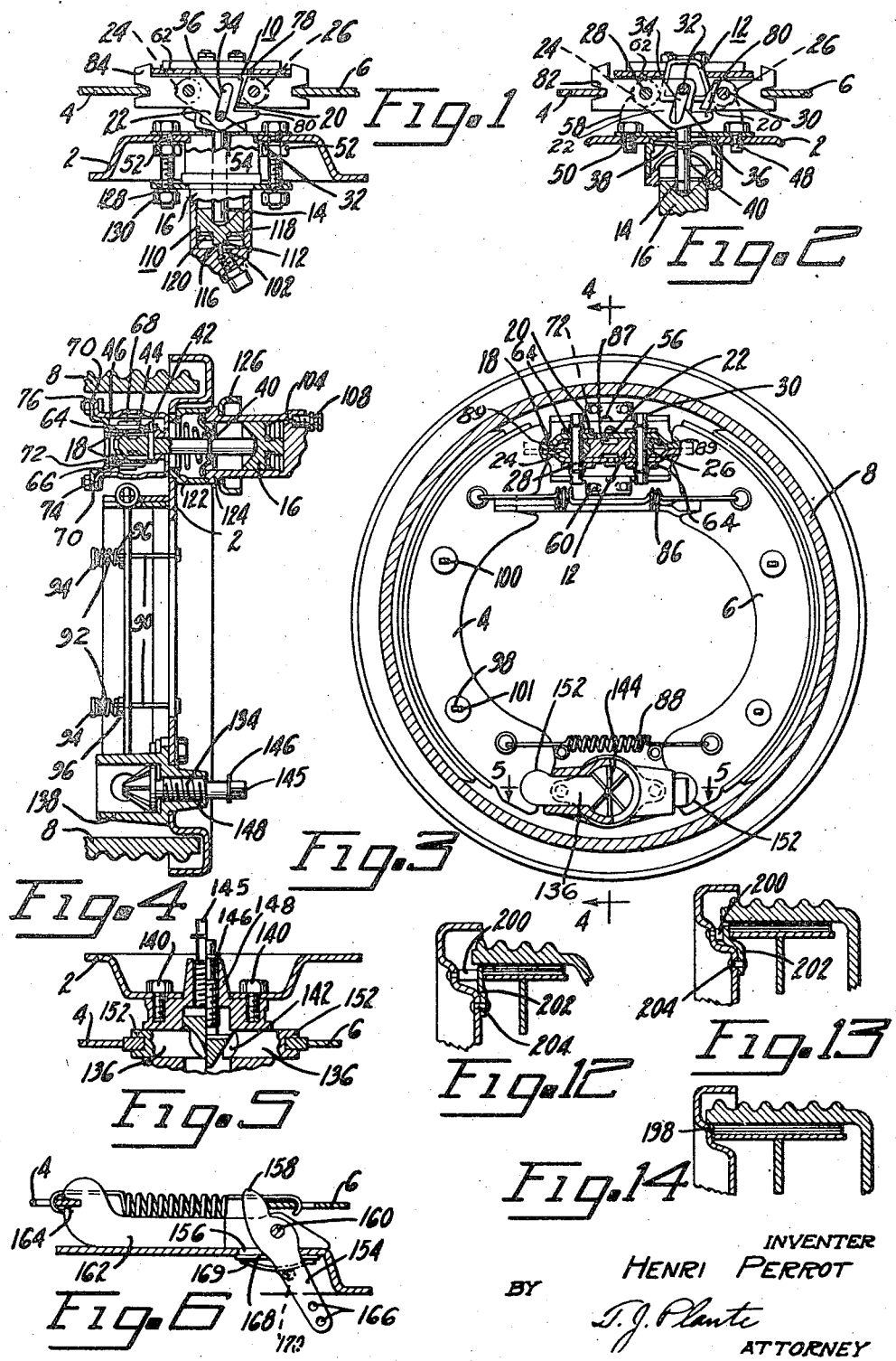

INVENTOR
HENRI PERROT
BY
ATTORNEY

Patented Apr. 15, 1947

2,418,848

UNITED STATES PATENT OFFICE 2,418,848

BRAKE

Henri Perrot, Paris, France; vested in the Attorney General of the United States Application May 20, 1942, Serial No. 443,791
In France January 29, 1941

8 Claims. (Cl. 188—78)

1

The invention relates to brakes and more particularly to brakes in which the applying means comprises a wedge acting on the brake shoes through the intermediary of a roller and links assembly.

One object of the invention is to provide a brake applying means forming an independent unit, the members of which cannot be separated one from another in spite of the relative movement of said members during the operation of the brake.

Another object of the invention is to provide a brake applying means including a wedge adapted to spread one from another a pair of links operatively connected to the brake shoes while upon release of the brake the return stroke of the wedge brings positively said links to normal position independently of the return of the brake shoes.

A still other object of the invention is to provide a fluid pressure operated cylinder for actuation of the wedge acting on the brake shoes, said cylinder being adapted to be secured to the backing plate in any angular position of the wedge with the bleeding port projecting upwardly, thus enabling an efficient bleeding operation.

Another object of the invention is to provide a brake provided with an adjusting means acting as an anchorage for the brake shoes and in which the adjustment of the anchorage is effected by rotating an accentric member through which extends a projection of the casing in which is located the adjusting means.

Other objects and advantages of the invention will be apparent from the following description, wherein reference is made to the accompanying drawings, in which:

Figure 1 is a view in section of the improved applying means shown in normal position.

Figure 2 is a view similar to Figure 1 and shows the applying means in a position corresponding to the end of its operating stroke.

Figure 3 is a view of a brake including the applying means shown on Figures 1 and 2, and in which the cover of the casing, in which is located said applying means, is removed.

Figure 4 is a vertical section on line 4—4 of the brake shown in Figure 3.

Figure 5 is a section on line 5—5 of the adjusting means shown in Figure 3, the left hand part of the figure showing the adjusting means in its initial position, while the right hand part of the figure shows the adjusting means in a position which corresponds to the end of its stroke.

Figure 6 is a view of an emergency applying means embodied in the brake shown in Figures 3 and 4.

2

Figure 7:
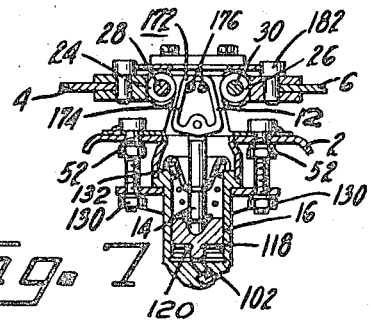
Figure 8:
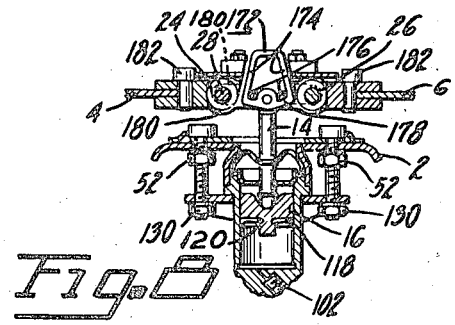

Figures 7 and 8 are similar to Figures 1 and 2, and show an embodiment of the improved applying means.

Figure 9:
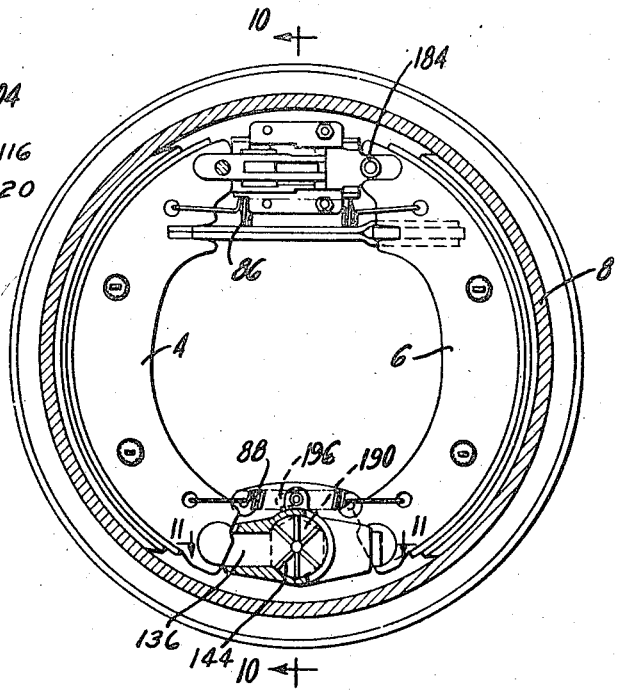

Figure 9 is a view of a brake provided with an applying means shown in Figures 7 and 8, and in which the left hand part of the cover carried by the casing enclosing the applying means is removed.

Figure 10:
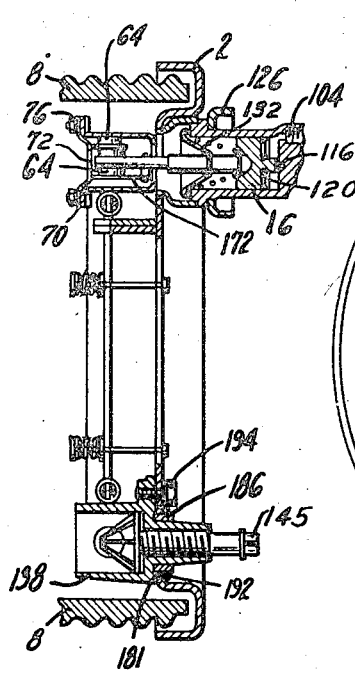

Figure 10 is a vertical section on line 10—10 of the brake shown in Figure 9.

Figure 11:
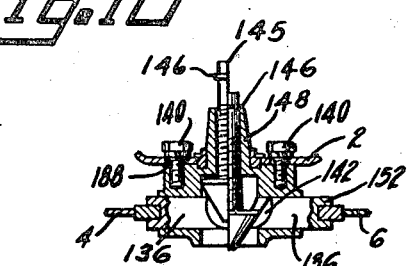

Figure 11 is a section on line 11—11 of the adjusting means shown in Figure 9, the left hand part of the figure showing the adjusting means in its initial position, while the right hand part of the figure shows the adjusting means in a position which corresponds to the end of its stroke.

Figures 12, 13 and 14 show positioning means for brake shoe rims.

The brake illustrated in Figures 1 to 6 comprises a backing plate 2 and brake shoes 4 and 6 adapted to be brought into contact with a rotating drum 8 under the control of an applying means indicated generally in 10. The applying means includes a wedge 12 adapted to reciprocate in a plane perpendicular to the backing plate and shown as being integrally made with an operating rod 14 actuated by a fluid pressure responsive cylinder indicated generally in 16. The wedge 12 acts on the brake shoes 4 and 6 through the intermediary of links 18 each formed on its inner end with a short projection 20 and a longer projection 22 between which extend the respective operating faces of the wedge. The links 18 are of identical construction, and the position of these links is inversed on the wedge 12, so that the latter is inserted on each side between a short projection 20 and a longer projection 22. The wedge acts on the links through the intermediary of operating rollers 24 and 26 mounted on pins 28 and 30 which extend through the projections formed on the links.

A pin 32 carried by the wedge projects into a slot 34 formed in the longer projections 22 and arranged in such a manner that the displacement of pin 32 in said slot, upon forward movement of the wedge, is not hindered by the spreading movement of the links operated by said wedge. The slot 34 is formed with an inclined ramp 36 which, on each of the projections 22, is arranged parallel to the operating surface of the wedge acting on the respective link.

In case the brake shoes would, for some reason, fail to return upon release of the brake, the links 18 will positively be brought to normal position by the wedge. As the wedge initiates its return stroke under the action of return spring 38 which takes support on a metal cup 40 carried by the operating rod 14, the pin 32 slides on the inclined ramp 36 provided in the longer projections 22 and thus urges the links 18 to normal position bringing them one closer and closer to the other, until they come into the position shown in Figure 1. The pin 32 is preferably secured to the wedge 12 by means of a cotter pin 42, which takes support on a disk 44 inserted on said pin and resting on the upper side of the wedge.

As illustrated in the drawings, the links 18 may be formed by two stampings of unequal shape defining the shorter projection 20 and the longer projection 22. These stampings can be secured one to the other on their outer ends for instance by spot welding.

The applying means 10 is located in a U-shaped casing designated generally in 46. This casing is secured to the backing plate 2 by means of bolts 48 extending through openings formed in its base and through corresponding openings 50 provided in the backing plate. On the bolts are mounted nuts 52 which, as shown in Figure 1, engage a depression formed in the backing plate and lock the casing in place. The base of the casing is also formed with a central opening 54 through which extends with play the operating rod 14. The lateral walls of the casing may be formed, as shown in Figure 3, with reinforcing ribs 56 and the edges of these walls may be shaped to provide guides 58 substantially parallel to the backing plate on which move the pins 28 and 30. The marginal portions of the casing walls are bent parallelly to the backing plate and in each of said portions there are formed circular openings 60. On the casing 46 is secured a cover 62 the inner face of which acts as a rolling table for supporting rollers 64 mounted in pairs on the pins 28 and 30 extending through the links. The rollers 64 are mounted on opposite sides of the links, preferably with interposition of distance washers 66, and said rollers are kept in place by means of split rings 68 mounted in grooves, formed at the outer ends of the pins 28 and 30. When the wedge 12 is moved forwardly, the operating rollers 24, 26, engaged thereby spread the respective links apart and the reaction forces are transmitted to the cover 62 through the intermediary of the supporting rollers 64 which roll, in operation, on the inner face of the cover. The latter is provided with marginal bent portions 70 corresponding to the bent portions formed on the cover. In the marginal sections 70, there are provided elongated openings 72, the middle position of which corresponds to that of the openings 60, and bolts 74 extending through these openings serve to secure the cover to the casing. As shown in Figure 4, on the bolts 74 are mounted nuts 76 and the head of these bolts is formed with a flat engaging the casing wall, so that the position of these bolts cannot be altered by vibrations inherent to the motion of the vehicle.

Since the openings 72 formed on the cover are elongated in the longitudinal direction, it is possible, by loosening the nuts 76, to adjust the position of the cover with respect to the casing, thus enabling a factory adjustment of the brake to be made, which adjustment is intended to compensate the manufacture clearances which are unavoidable in the practice. The cover 62 is formed with a rectangular opening 78 through which extends freely the wedge when the latter has completed its operating stroke, as shown in Figure 2. It will be noted that the wedge 12 is mounted floatingly, so that it can move in either direction. The wedge can thus follow the brake shoes in their displacement and compensate the difference in the wear of the linings mounted on the shoes.

The longer projection 22 is formed with a lug 80 having a shape complementary to that of the adjacent short projection 20 and a suitable play is left between these projections. The outer link ends are formed with slots 82 into which project the webs of the shoes 4 and 6. It will be noted that a play is left between the outer edge of the links and the adjacent wall of the cover, while the inner edge of the links also clears the walls of the casing. Thanks to this arrangement, even in case the links 18 were covered with a layer of rust, no locking effect can take place since the links are suspended in the air.

The outer ends of the links 18 are provided with abutments 84, which take support on the opposite ends of the cover, beyond the plane in which extend the shoe webs, which are connected one to the other by return springs 86 and 88, so that the component resulting from this overhanging effect tends to urge, in normal position, the links, the supporting rollers and their pins, into contact with the cover, to lock them in position, thus avoiding any clicking noise during the motion of the vehicle.

It results from the foregoing that if for some reason, the brake shoes would lag to return to normal position, the links would not become disassembled from the applying means assembly; the interlock between these members is due to the fact that the outward pivoting of the links on the pins 28 and 30 is limited due to the fact that the edges of the links extend closely to the cover 62, while the inward pivoting of the links is limited by engagement of the lug 80 formed on one link with the shorter projection 20 of the other link. The applying means thus forms an independent unit, the members of which are kept in place without any possibility of leaving the unit, in spite of the relative displacement of these members in operation.

The wedge 12 can be manufactured by drop forging and formed on each side with a recess 87 of trapezoidal shape which facilitates the provision of straight surfaces adapted to slide between the forked projections of the links. As shown on Figure 3, in order to eliminate the friction of the sides of the operating rollers 24, 26 on the inner walls of the forked links 18, these rollers are formed with a chamfer 89 on the major part of their sides.

In order that the brake shoes may be kept in proper lateral position with respect to the backing plate, there are provided return springs 92 inserted on pins 90 which pass through openings formed in the backing plate and corresponding openings provided in the brake shoe webs. The return springs take support on a metal cup 94 mounted at the end of the pin 90 and on a cup 96 which takes support on the brake shoe web. In order to assist the mounting of the springs, the cups are formed with rectangular slots 98 through which are inserted flattened heads 100 provided on the pins so that by rotating the pins a quarter of revolution, the flattened heads are seated into a recess 101 formed in the cup 94 perpendicularly to the slot 98 thus locking the spring in the place.

The operating wedge is preferably actuated by a fluid pressure responsive cylinder 16 perpendicular to the backing plate and arranged outwardly, so that the cylinder is subject to an intense cooling being swept by a stream of air which is created by the motion of the vehicle.

The cylinder 16 is provided with an inlet port 102 and a bleeding port 104 which is closed in normal position by a bleeding screw 108.

A piston 110 mounted in the cylinder is formed with a central projection 112 which, in normal position of the hydraulic system, takes support on the cylinder head, under the action of the return spring 38 acting on the operating rod 14. The projection 112 is formed with a slot 116 which registers with the feeding port 102 so that in normal position, the fluid pressure responsive cylinder 16 is connected to the piping of the hydraulic system. An annular sealing cup 118, made of rubber, is inserted in a groove 120 formed on the projection 112. The object of this cup is to prevent seepage of liquid along the piston.

The angular position of the cylinder 16 can be adjusted so that in any position of the applying means on the backing plate, the bleeding port 108 can be arranged on the top of the cylinder.

The wheel cylinder is preferably mounted through the intermediary of a cross member 122 which acts as a seat for the return spring 38. The cross member 122 takes support on one side of an annular shoulder 124 formed on the cylinder, while the opposite end of this shoulder takes support on a bracket 126 preferably secured in place by means of the bolts 48 which serve for securing the casing 46 to the backing plate. The bolts 48 pass through openings 128 formed in the bracket and on the ends of these bolts are mounted nuts 130 by means of which the cylinder 16 is firmly secured to the backing plate. By dismounting the nuts 130, the cylinder can be easily removed, and it is possible therefore to replace a cylinder of one diameter by a cylinder of another diameter, thus increasing the range of vehicles adapted to be equipped with the brake forming the object of my invention. The fluid pressure responsive cylinder is separated from the operating wedge by a rubber cover 132 inserted on the one hand on the rod 14 and on the other hand on the end of the cylinder.

The brake shoe ends opposite to the applying means take support on an adjusting screw 134 through the intermediary of plungers 136 located in a casing 138. This casing is mounted on the backing plate, such as by means of screws 140 which extend through cooperating openings formed in the backing plate and in the casing. The plungers 136 are provided with beveled ends 142 which cooperate with notches 144 formed on the beveled head of the adjusting screw 134.

When the brake linings are new, the adjusting screw 134 is in the position shown on the left hand part of Figure 5, and as the linings become worn, the screw is rotated for one or more notches, for instance by means of a key inserted on a square 145 formed on the outer end of this screw. The adjusting screw 134 is thus driven further and further into the casing 138, whereby the plungers are spread one from another enabling to keep when the brake is released, a normal play between the shoes and the brake drum. The adjusting screw 134 carries an abutment ring 146 which, in a position corresponding to the end of the stroke of the adjusting screw, takes support on a boss 148 formed in the casing, thus limiting any further advance of the screw. It results therefrom that when the lining becomes completely worn out, the brake shoe rims cannot wear out due to friction against the periphery of the drum.

The plungers 136 are formed, at their outer ends, with slots, the bottom of which forms an inclined plane on which take support the respective brake shoes through the intermediary of a trunnion 152 formed with a corresponding inclined plane, as described in U. S. application Serial No. 279,266, now Patent No. 2,269,268, Jan. 6, 1942. Each trunnion is located in a corresponding recess formed on the end of the brake shoe web. Thanks to this arrangement, the braking torque transmitted by the shoes is received by members having an area sufficient to resist an important load, while allowing the shoe to rock freely about its end.

Besides the fluid pressure applying means described above, the brake is provided with a mechanical applying means illustrated in Figure 6 and which includes a lever 154 passing through an opening 156 provided in the backing plate and which is formed with a rounded projection 158 taking support on the web of the brake shoe 6. The lever 154 is connected by a pin 160 to a link 162 provided at its end with a slot 164 into which projects the web of brake shoe 4. On the outer end of the lever 154 there are provided one or several openings 166 for attachment of the end of a cable or rod connected to the hook-up operated by the hand lever. When the hand lever is put into action, the brake shoe 6 is pressed against the drum and forms an abutment for the lever 154 acting on the link 162, as a result of which the other brake shoe is likewise applied against the drum. The lever 154 projects through a cover 168 closing the opening 156, and this cover is applied against the backing plate by means of a leaf spring 169 kept in place by a cotter pin 170 which passes through an opening formed in the lever 154.

It results from the foregoing that when the brake shoes are brought into contact with the drum by the mechanical applying means, this operation does not affect the fluid pressure operated cylinders due to the fact that the piston 110 is kept immovable by the return spring 38 which acts on the operating rod 14; the piston projection 112 is therefore kept in engagement with the head of the cylinder. There is thus eliminated the creation of a detrimental vacuum which could tend to take place in case the actuation of the mechanical applying means should affect the hydraulic applying means.

The embodiment illustrated in Figures 7 to 11 is similar to that described above and the similar members in said figures are indicated by same reference numerals.

In this embodiment the operating wedge 12 carries, such as by means of a pin, a slide 172 with two inclined ramps 174 of opposite directions which are parallel to the inclined operating faces of the wedge. Each of these ramps is engaged with a pin 176 carried by the forked links 18.

It results from the foregoing that to each stage of spreading of the links, there correspond sections of the slide 172, which are removed more and more one from another, so that when the wedge 12 is brought to the end of its operating stroke by the fluid pressure responsive cylinder 16, the pins 176 are in contact with the member 178 which connects the inclined ramps, as illustrated in Figure 8.

When the brake is released, the slide 172 brings back the links upon the return movement of the wedge, drawing together the pins 176 by means of the inclined ramps 174, thus bringing them one adjacent the other.

In the embodiment illustrated in Figures 7 to 11, the pins 28 and 30 carry the operating rollers 24, 26 and two pairs of supporting rollers 64 adapted to roll in operation on the inner face of the cover 70 and the pins 28 and 30 are adapted to move in alined longitudinal slots 180 formed in the walls of the casing 46. The outer ends of the links 18 are forked and form a slot parallel to the backing plate in which project the webs of the respective brake shoes. Pins 182 which extend through alined openings provided in the forked ends of the links are formed with heads which in normal position seat in recesses 184 at the ends of the cover. Due to the fact that the heads of these pins take support on the cover in a plane extending beyond the plane in which act the return springs 86, 88 inserted between the brake shoe webs, a component is created which, in normal position of the brake, urges the links, with the supporting rollers 64 into contact with the inner face of the cover. The assembly formed by the supporting rollers 64, their pins 28, 30 and the links 18, is therefore locked in place in normal position of the brake, thus suppressing any clicking noise when the vehicle is in motion. As the brake is set into action, the pins 28 and 30 clear the edges of the cover and the supporting rollers 64 roll freely on the rolling table formed by the inner face of the cover, thus insuring an efficient operation of the applying means. As already indicated for the first embodiment, under action of the load, the assembly formed by the links, the operating rollers 24, 26 and the wedge, is alined in one plane, thus avoiding any wedging effect.

The brake embodiment illustrated in Figures 7 to 11 is provided with an adjusting means similar to that shown in Figure 5 with this difference, however, that it comprises novel means for adjusting of casing 138 in the plane in which the plungers 136 act on the respective shoes. The casing 138 is located in a cylindrical eccentric member 186 mounted in an elongated vertical opening 181. The casing 138 is secured to the backing plate by means of screws 140 which extend through elongated openings 188 provided in the backing plate. It results from the foregoing that by rotating the eccentric member 186, after having previously loosened the screws 140, the position of the casing is adjusted in the plane in which act the plungers, while the eccentric member 186, adjusts its position in the elongated opening 181, being kept in linear contact with the walls of said opening. The eccentric member 186 is formed on its outer side, for instance with a hexagonal section 190 projecting into a complementary opening provided in a plate 192 immobilized by means of a screw 194 secured to the casing. The screw 194 extends through an arcuate slot 196 formed in the plate, in order that the latter could shift with the eccentric member 186 when one proceeds to the adjustment of the position of the casing on the backing plate. When the adjustment is completed, the screw 194 is fixed in place thus immobilizing the eccentric member 186 through the intermediary of the plate 192.

A suitable choice of the position of the adjusting means on the backing plate enables to compensate manufacture clearances, which is realised in the first embodiment by adjusting the position of the cover 62 on the casing 46.

It is to be noted that the attachment of the casing by means of screws which extend with play through openings provided in the backing plate brings about the danger inherent to a possible loosening of the screws under the action of trepidations taking place during the motion of the vehicle. This risk is eliminated in the embodiment illustrated in Figures 9–11 due to the fact that the casing of the adjusting means mounted in the eccentric member 186 is kept in linear contact with either edge of the elongated port 181 formed in the backing plate.

Under the action of lateral return springs, the brake shoe rims take support either directly in a recess 198 provided in the backing plate, as illustrated in Figure 14, or on stops 200, of variable height, as shown in Figures 12 and 13. The use of stops of variable height enables to use the same backing plate for brake shoes and drums of various widths. The stops 200 can be riveted to the backing plate and mounted at the end of a lug 202, the opposite end of which is secured to the backing plate such as by means of a rivet 204.

Although this invention has been described in connection with certain specific embodiments, the principles involved are susceptible of numerous other applications that will readily occur to persons skilled in the art. The invention is, therefore, to be limited only as indicated by the scope of the appended claims.

What I claim is:

1. A brake comprising two shoes, a brake drum, a wedge operatively connected with the shoes for expanding the latter into contact with the drum upon operative stroke of the wedge, links forming part of the operative connection, and means acting through the wedge for returning the links to normal position independently of the return of the shoes upon retractile stroke of the wedge.

2. A brake comprising two shoes, a wedge operatively connected with the shoes, links forming part of the operative connections, a forked portion at the inner end of the links comprising projections of different lengths and arranged above and below the wedge, and means interlocking the projections with the wedge for positively bringing back the links to normal position upon the return movement of the operating wedge.

3. A brake comprising friction means, a wedge operatively connected with the friction means, a link forming part of the operative connections, a forked portion on the inner end of the link comprising a longer projection arranged at one side of the wedge and a shorter projection arranged at the opposite side of the wedge, a slot in the longer projection formed with a ramp parallel to the adjacent operating face of the wedge, and means carried by the wedge and engaging the ramp.

4. A brake comprising friction means, a wedge operatively connected with the friction means, links forming part of the operative connection, a forked portion in the inner end of each link comprising a longer projection arranged at one side of the wedge and a shorter projection arranged at the opposite side of the wedge, a slot in the longer projection formed with a ramp parallel to the adjacent operating face of the wedge and means carried by the wedge and engaging the ramps on opposite sides of the wedge.

5. A brake comprising friction means, an operating wedge operatively connected with the friction means, links forming part of the operative connection, a slide carried by the operating wedge, and means interlocking the slide with the links.

6. A brake comprising friction means, an operating wedge, links connecting the friction means with the operating wedge, a slide carried by the operating wedge, a pair of ramps provided on the slide and respectively parallel to the operating faces of the wedge, and means carried by the links and engaging the ramps.

7. A brake comprising friction means, a brake drum, a backing plate, an applying means operatively connected with the friction means, links forming part of the operative connection, a casing secured to the backing plate and enclosing the applying means and the links, and means within the casing interlocking the applying means and the links.

8. A brake comprising friction means, a brake drum, a backing plate, an applying means operatively connected with the friction means, links forming part of the operative connection for bringing the friction means into contact with the drum as the applying means is set into action, a casing secured to the backing plate and enclosing the applying means and the links, and means within the casing for positively returning the links to normal position as the applying means is set out of action.

HENRI PERROT.

REFERENCES CITED

The following references are of record in the file of this patent:

UNITED STATES PATENTS

| Number | Name | Date |
|---|---|---|
| 1,980,611 | Brisson | Nov. 13, 1934 |
| 2,132,730 | Geyer | Oct. 11, 1938 |
| 1,908,013 | Evans | May 9, 1933 |
| 2,263,949 | Harle | Nov. 25, 1941 |
| 1,644,726 | Hunt | Oct. 11, 1927 |
| 1,989,181 | Andres | Jan. 29, 1935 |
| 1,994,823 | Kohr | Mar. 19, 1935 |
| 2,038,707 | Begg | Apr. 28, 1936 |
| 2,154,636 | Nickell | Apr. 18, 1939 |
| 1,875,989 | Charles | Sept. 6, 1932 |
| 2,161,903 | Sawtelle | June 13, 1939 |
| 1,453,126 | Bryan | Apr. 24, 1923 |